United States Patent [19]

Trautwein

[11] Patent Number: 4,697,663
[45] Date of Patent: Oct. 6, 1987

[54] THREE-WHEELED VEHICLE

[76] Inventor: Wolfgang Trautwein, Droste-Weg 5, D-7758 Meersburg, Fed. Rep. of Germany

[21] Appl. No.: 775,509

[22] Filed: Sep. 12, 1985

[30] Foreign Application Priority Data

Sep. 15, 1984 [DE] Fed. Rep. of Germany ....... 3433986

[51] Int. Cl.$^4$ ............................................. B62D 61/06
[52] U.S. Cl. .................................... 180/210; 280/302
[58] Field of Search ............... 180/210; 280/301, 302, 280/303, 763.1, 764.1, 112 A

[56] References Cited

U.S. PATENT DOCUMENTS 4,020,914 5/1977 Trautwein ........................... 180/210
4,088,199 5/1978 Trautwein ....................... 280/112 A

FOREIGN PATENT DOCUMENTS 501464 11/1954 Italy ..................................... 280/302
155025 12/1920 United Kingdom ................ 280/302
359089 10/1931 United Kingdom ................ 280/302

Primary Examiner—John J. Love
Assistant Examiner—Ross Weaver
Attorney, Agent, or Firm—McGlew and Tuttle

[57] ABSTRACT

A vehicle with three wheels includes a single rear driven wheel and two front steerable wheels. The front wheels are supported by cross members in a parallelogram mechanism carried by the frame of the vehicle. A platform is connected to the frame and extends rearwardly of the cross members on both sides of the lower cross member. A U-shaped center stand is pivotally connected to the platform an axis extending perpendicularly to the longitudinal axis of the vehicle. The center stand in its deployed supporting position also engages the vehicle frame for keeping the vehicle upright.

10 Claims, 6 Drawing Figures

THREE-WHEELED VEHICLE

FIELD AND BACKGROUND OF THE INVENTION

This invention relates to a three-wheeled vehicle with a driven rear wheel typical of a motorcycle and two steerable front wheels coupled symmetrically to the motorcycle frame by means of a parallelogram-type wheel support, which includes two cross member one above the other and a foot resting platform attached to the lower cross members and extending rearward along each side of the frame.

Such a vehicle is disclosed in the German Patent Application DE OS No. 27 07 562.* Since this vehicle configuration is characterized by a platform remaining essentially horizontal at all times whereas the vehicle frame can lean with respect to the platform, it may be difficult to park the vehicle. The known vehicle concept therefore comprises a locking device for connecting the platform and vehicle frame in such a manner that the frame is locked in an essentially upright position with respect to the platform. This is accomplished by means of a linkage pivotally mounted to the platform, which is latchable in a latch attached to the frame. Since this locking device has no contact to the ground, there is no parking brake action combined with the locking.
*and U.S. Pat. No. 4,088,199; U.K. Pat. No. 1 561 253; Japanese Pat. No. 1 176 544; Italian Patent Application No. 48 171 A/77; Taiwanese Utility Patent UM-9367.

SUMMARY OF THE INVENTION

It is the objective of this invention to improve the described vehicle category by providing a convenient and above all safe parking mode. Locking of the vehicle frame shall be combined with ground contact by a stand. This locking device shall be simple to operate and shall serve as a parking brake which is released automatically when the vehicle accelerates, thus providing a high degree of operating convenience.

According to the invention this is accomplished by locking the vehicle frame in its upright position by means of a U-shaped center stand pivotally mounted to the platform or to the frame with its pivot axis perpendicular to the vehicle longitudinal axis, further comprising a two-sided operating lever attached to the frame or to the platform which is linked to the center stand.

In the case of the center stand mounted to the platform the center stand must lock the frame in its upright position when deployed.

This is accomplished by two flat surfaces to the left and right of the frame which can engage in latches included in the center stand in the deployed position. To this end the center stand may be pivotally mounted to a cross member connecting the left and right side of the platform at its rear or front section.

It is further advantageous to link the operating lever and the center stand by means of cables or chains so that there is no jamming even for large deflections. In a simple embodiment the cable can be attached to the center stand in the general area of the latch.

For returning the operating lever and center stand to their resting position there should be one or more springs linking the frame or platform to the operating lever and/or the center stand.

The center stand and operating lever may be located in the rear or in the front section of the vehicle and connected by a cable extending essentially vertically; in another embodiment it is possible to locate the center stand in the front or rear section and the operating lever in the rear or front section of the vehicle wherein said cable connecting the stand and the lever extends in an essentially horizontal direction.

The operating lever may be operated by hand or by foot. In the case of the operating lever located in the front section of the vehicle it is practical to install a warning sign, a warning lamp or similar device which becomes visible when the operating lever is moved from its resting position.

For a vehicle as set forth in the main portion of claim 1 comprising a U-shaped center stand, pivotally mounted to the foot resting platform or to the vehicle frame, said center stand being connected to an operating lever pivotally mounted to the vehicle frame or to the platform then the rider of said vehicle is given the opportunity to deploy the center stand without getting off the seat of the vehicle. The center stand can be readily deployed thereby providing the effect of a parking brake and of a locking mechanism for the frame while the rider has planted both feet on the platform. When accelerating the vehicle from a parked position the center stand will automatically retract into its resting position as soon as its dead center position is passed.

By virtue of the center stand configured according to the invention even such three-wheeled vehicles comprising a frame which can lean with respect to a foot resting platform, can be parked simply and in short time but nevertheless in a perfectly safe manner. The center stand deployed to engage the ground performs the function of a parking brake. Since its deployment is easily accomplished from inside the vehicle, there is not only accomplished a simple handling and a high degree of operating convenience, but there is also accomplished an increase in rider safety, because there is no need for the rider to stand on the side of the vehicle for stand deployment. Furthermore he can leave the vehicle on the safest side as far as traffic conditions are concerned. He also can get on the vehicle from the left or right hand side whichever side is safest.

BRIEF DESCRIPTION OF THE DRAWINGS

In the figures several embodiments of center stands according to the invention are shown, installed in leaning three-wheeled vehicles. A description of the figures follows.

DESCRIPTION OF THE PREFERRED EMBODIMENTS

Figure 1:
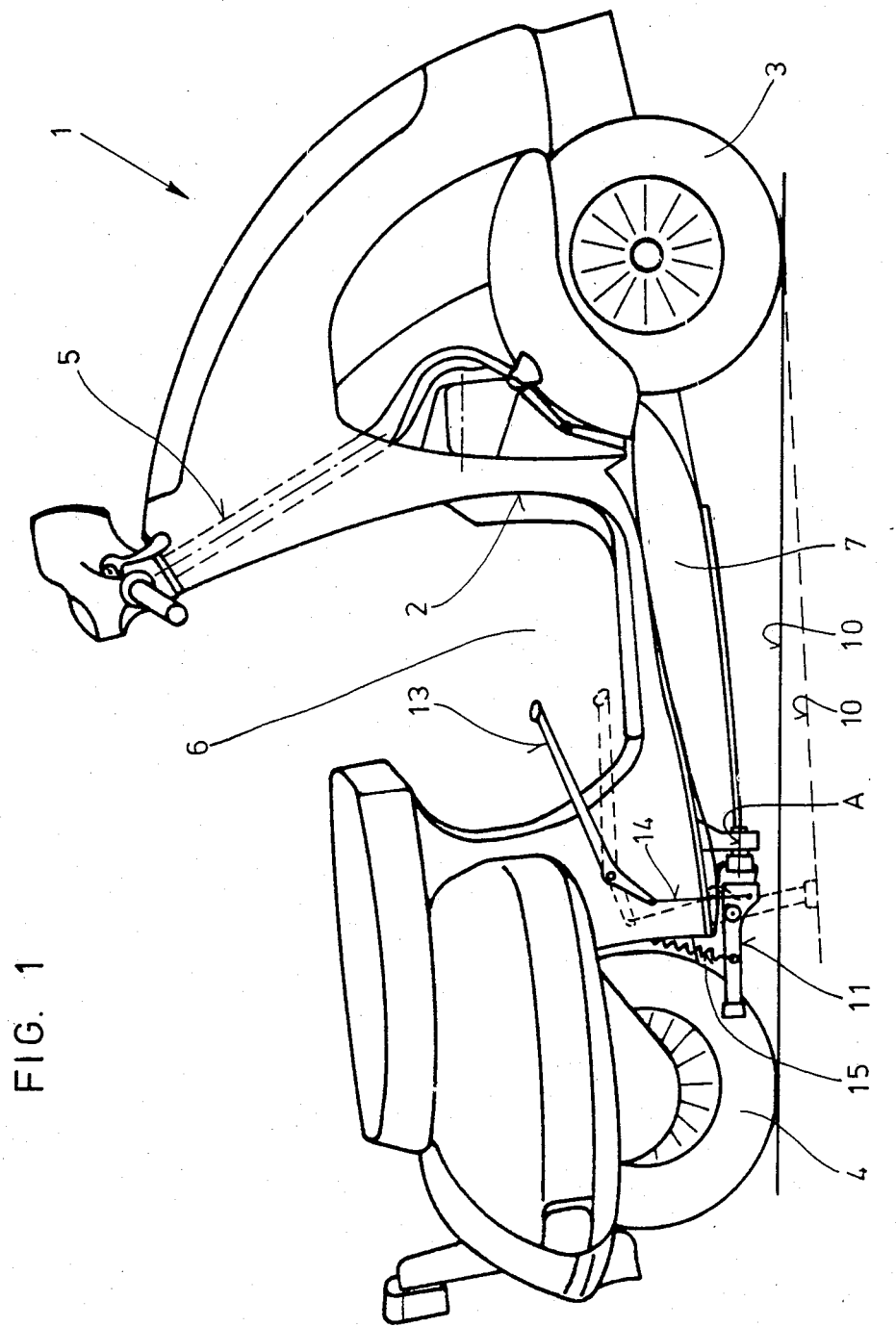
FIG. 1 is a side view of a three-wheeled vehicle with a stand installed in the rear section of the platform.
Figure 4:
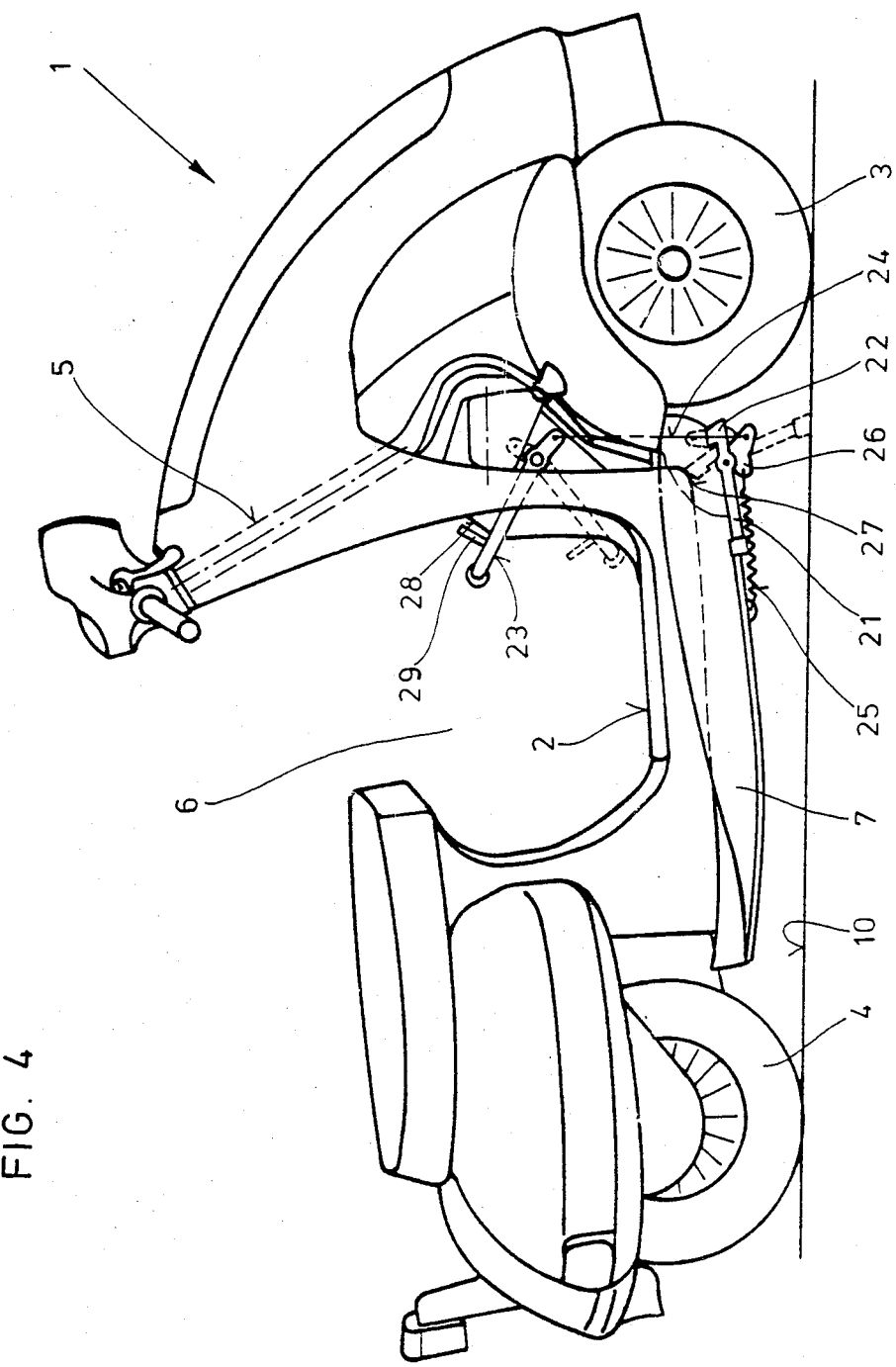
FIG. 4 is a three-wheeled vehicle with a stand installed in the front section of the platform.
Figure 5:
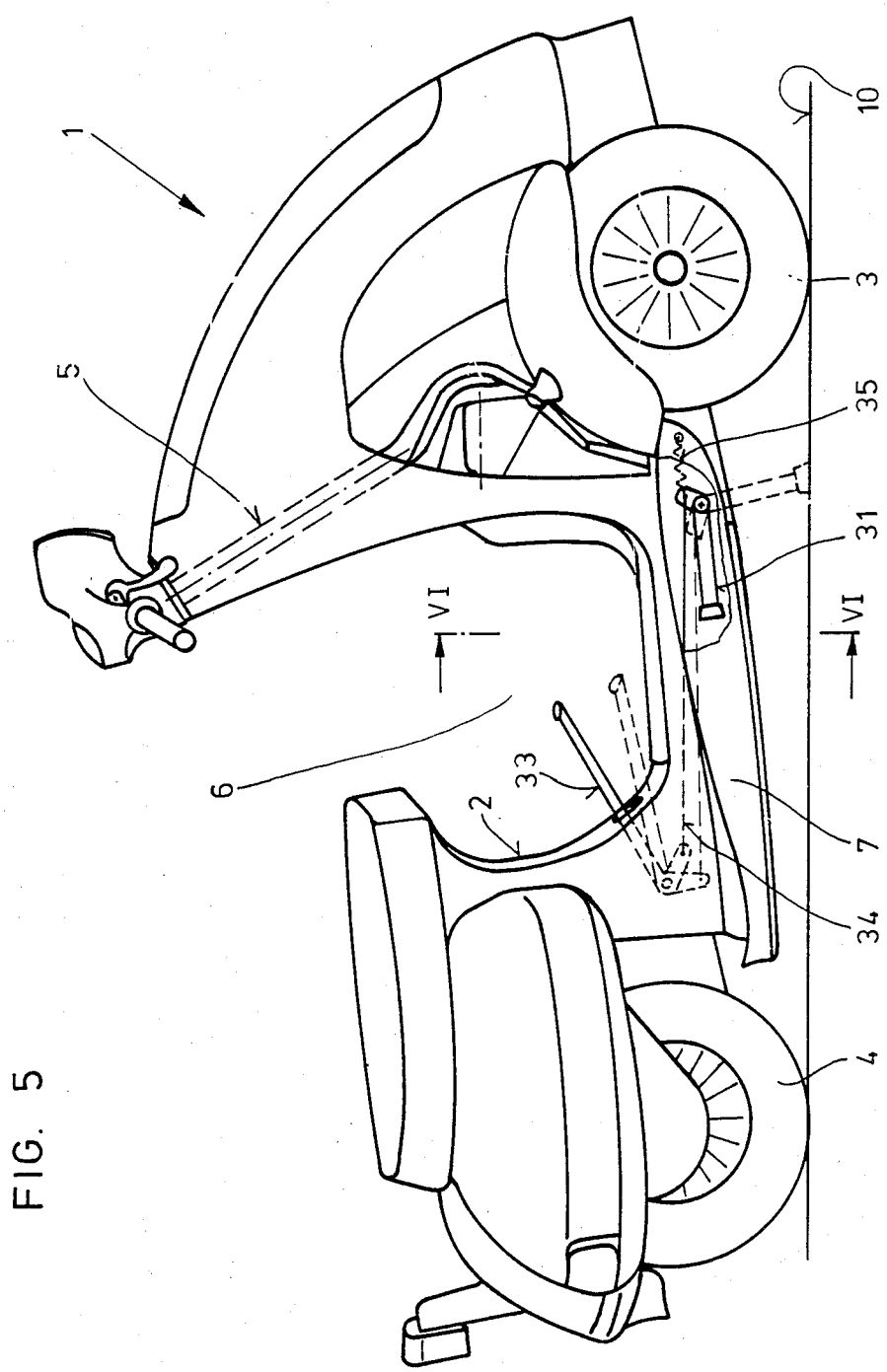
FIG. 5 is the vehicle of FIG. 4 with a stand pivotally mounted to the frame.

The three-wheeled vehicle similar to a motorcycle as shown in FIGS. 1, 4 and 5 consists primarily of a vehicle frame 2, two front wheels 3 which are spaced symmetrically to the left and right of the vehicle longitudinal axis A and which are steerable by means of a steering device 5, said wheels being suspended by means of parallelogram-type cross members (not specifically numbered) said vehicle further comprises a rear wheel 4 and a foot resting platform 7 extending longitudinally on both sides of the vehicle frame 2. The platform 7 is attached to the lower of the cross members thus remaining in an essentially horizontal position at any lean angle of the vehicle frame 2.

Figure 2:
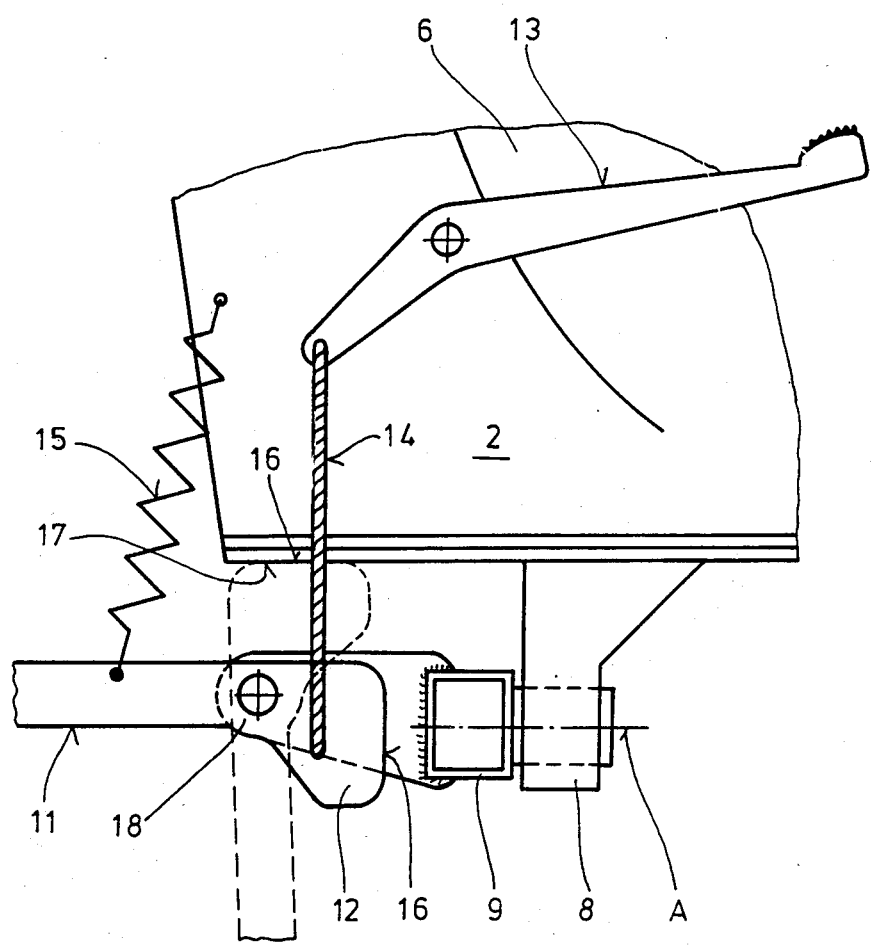
FIG. 2 is an enlarged partial side view of the stand shown in FIG. 1.
Figure 3:
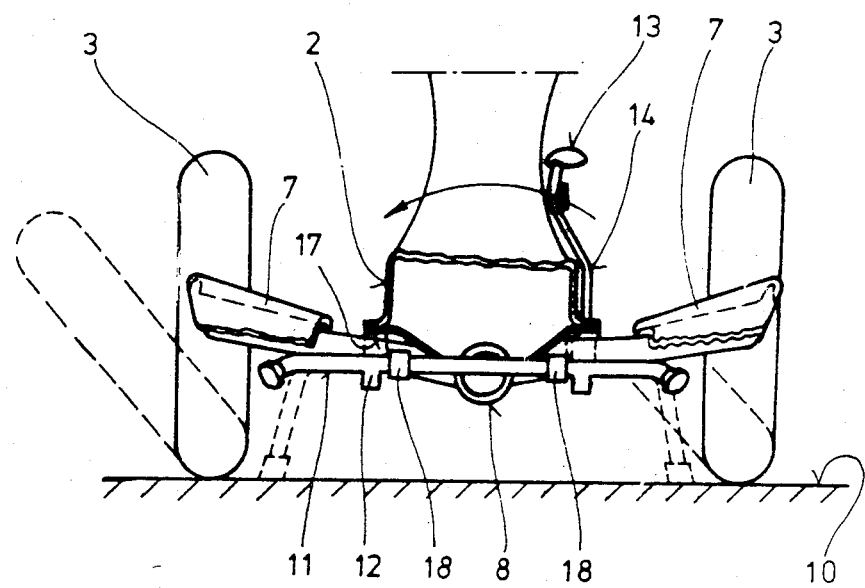
FIG. 3 is a partial rear view of the stand shown in FIG. 1.

For safety parking the vehicle 1 there is a U-shaped stand 11 which is pivotally mounted to the rear section of platform 7 as shown in FIGS. 1 through 3. To this end there are two bearings 18 attached to a cross member 9. Said cross member 9 is pivotally attached to the frame by means of bearing 8. Said two bearings 18 provide pivotal support to stand 11. Furthermore there is an operating lever 13 pivotally mounted to the vehicle frame 2 located in the leg area 6 of vehicle 1 for actuating the stand 11 by means of a cable 14 which connects operating lever 13 to stand 11. Stand 11 is kept in its retracted position by means of a tension spring 15 which is mounted between the vehicle frame 2 and stand 11.

For parking the vehicle 1 on the ground 10, the rider will depress the operating lever 13 located in the leg area 6 before he has left the vehicle. This will pivot the stand 11 about a pivot axis perpendicular to the vehicle longitudinal axis by means of tension in cable 14 connected to the operating lever 13. The stand will then provide firm support for the vehicle on the ground 10 as shown in dashed lines in FIG. 1.

Since the vehicle frame 2 can lean with respect to platform 7, with the stand 11 pivotally mounted to cross member 9 by means of bearings 18, the stand 11 includes two latches 12 which are contoured with flat spots 16 which can provide stops for the flat surfaces 17 of vehicle frame 2. Thus in the parked condition the vehicle frame 2 is locked against leaning with respect to platform 7 assuring firm support of vehicle 1 on the ground 10. For releasing the parking brake provided by stand 11 and at the same time releasing the lock against leaning the vehicle 1 is merely accelerated under its engine power thereby pivoting stand 11 backwards which is then pulled into the resting position by spring 15.

The embodiment of the invention in FIG. 4 differs from the embodiment in FIG. 1 in the location of the center stand. Here center stand 21 is located in the front section of platform 7 and connected to the operating lever 23 in the forward area of leg room 6. For locking platform 7 and vehicle frame 2 against leaning the stand 21 which is pivotally mounted again includes two latches 22 which can provide stops for the flat surfaces 27 of vehicle frame 2 in the parked condition. A tension spring 25 attached to the frame 2 in the rear and to a short arm 26 of stand 21 can pull the stand into its resting position.

An optical warning device 28 mounted to frame 2 in combination with a cover 29 attached to operating lever 23 can provide a simple orientation for the rider of vehicle 1. In the retracted position the stand 11 will keep the warning device covered. In the parked condition, however, the warning sign 28 is visible to the rider.

Figure 6:
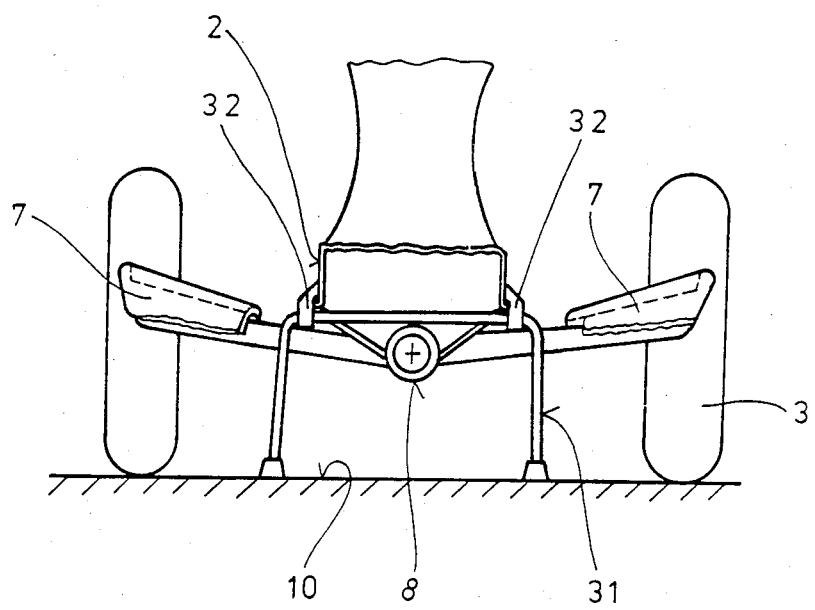
FIG. 6 is a sectional view of the vehicle shown in FIG. 5 as it would appear along the lines VI—VI shown in FIG. 5.

In the embodiment of the inventiion of FIGS. 5 and 6 the stand 31 is located in the front section of vehicle 1 and pivotally mounted to the vehicle frame 2 by means of bearings 32. When deployed the U-shaped stand 31 will provide firm support of the vehicle frame 2 on the ground 10 thereby locking the vehicle against leaning. In this embodiment no engagement between vehicle frame 2 and platform 7 is required.

For convenient deployment of stand 31 an operating lever 33 is pivotally mounted to vehicle frame 2 in the rear section of leg room 6 and connected to the stand 31 by means of cable 34. Tension spring 35 anchored to vehicle frame 2 will pull the stand 31 into its resting position when the vehicle is accelerated beyond the dead center position of stand 31.

I claim:

1. A three-wheeled vehicle with driven rear wheel typical of a motorcycle and two steerable front wheels spaced symmetrically to the left and right of the vehicle's longitudinal axis, the front wheels being supported by a suspension with cross members in parallelogram manner, the vehicle further comprising a main vehicle frame and a platform extending rearward from a lower one of said cross members on both sides of the main vehicle frame which interconnects at front wheel suspension and the rear wheel, said main frame being pivotally connected to said cross members and to said platform; what is claimed is a U-shaped center stand pivotally connected to the vehicle platform with its pivoting axis perpendicular to the longitudinal axis; operating means connected to the mainframe, said operating means being interconnected to said center stand; and said center stand locking said main frame with respect to the platform when activated.

2. Three-wheeled vehicle as set forth in claim 1, wherein said main frame (2) includes a left and right flat surface (17; 27) and wherein said center stand (11) includes matching latches (12; 22) which can lock the main frame (2).

3. Three-wheeled vehicle as set forth in claims 1 or 2 wherein said center stand (11) is pivotally mounted to a cross member (9) by means of bearings (18), said cross member (9) connecting the left and right portions of the platform (7) in the rear or front of the platform.

4. Three-wheeled vehicle as set forth in claim 1 wherein a warning sign (28) is installed in the front section of vehicle frame (2) of the vehicle (1) which is visible when the operating lever (23) is moved from his resting position.

5. Three-wheeled vehicle as set forth in claim 1 or 2 further comprising cable means for connecting the center stand to the operating lever.

6. Three-wheeled vehicle as set forth in claim 1 or 2 wherein said operating means comprises an operating lever (13) and a cable (4) connected to said stand and which is attached to the operating lever (13) at the location of a latch (12) on said stand.

7. Three-wheeled vehicle as set forth in claim 6 wherein said operating lever is pivoted for deployment against the force of a spring which is anchored to the main frame (2).

8. Three-wheeled vehicle as set forth in claim 6 wherein said center stand and operating lever are located in the rear section of the vehicle and are interconnected by the cable (14; 24) which extends in an essentially vertical direction.

9. Three-wheeled vehicle as set forth in claim 6 wherein said center stand is located in the front section and wherein said operating lever is located in the rear section of the vehicle and interconnected by the cable (34) extending in an essentially horizontal direction.

10. Three-Wheeled Vehicle as set forth in claim 1 or 2, wherein said operating lever is operable manually or by foot.

* * * * *